Oct. 21, 1924.

H. C. WALLACE

FAN BLOWER

Filed Sept. 11, 1922

1,512,322

INVENTOR
Halbert C. Wallace
BY
ATTORNEY

Patented Oct. 21, 1924.

1,512,322

UNITED STATES PATENT OFFICE.

HALBERT C. WALLACE, OF FARGO, NORTH DAKOTA.

FAN BLOWER.

Application filed September 11, 1922. Serial No. 587,315.

*To all whom it may concern:*

Be it known that I, HALBERT C. WALLACE, a citizen of the United States, residing at Fargo, in the county of Cass and State of North Dakota, have invented certain new and useful Improvements in Fan Blowers; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to grain blowers and particularly to a pneumatic propelling means for conveying grain.

The device is generically designated a "fan blower" because the fan is the propelling medium for the air. Such devices in so far as the generic principle is involved have been used prior to my invention. In such devices of which I have any knowledge, however, the grain has been delivered into the fan casing and during the propelling action the fan blades come into contact with the grain and the grain is impacted against the fan casing or housing, the impacts from both the fan blades and from contact with the housing being sufficient to break a considerable quantity of the grain, which obviously is a great disadvantage.

My invention contemplates the provision of means whereby the grain is introduced into the blower outside of the vortex chamber; that is, outside of the fan casing proper, and the grain is fed into position to have the force of the air exerted against it without liability of the grain being impacted against any part of the blower. Therefore, it is carried along through the delivery conduit to the points of discharge without being broken.

The novel construction of the invention will be clearly understood by reference to the following description in connection with the accompanying drawings, in which—

Figure 1:
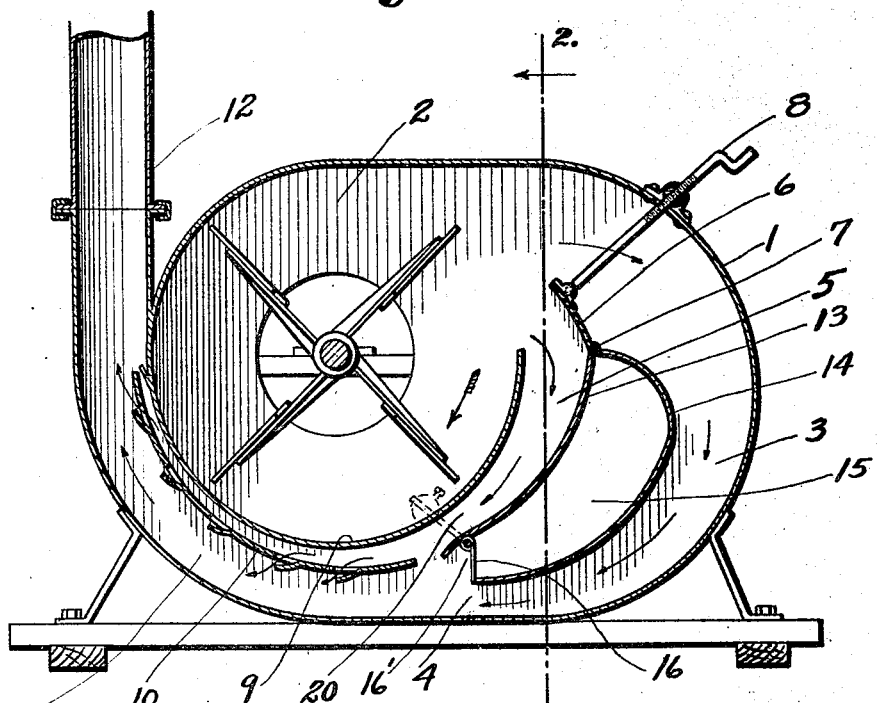
Fig. 1 is a vertical, longitudinal, sectional view through a fan blower constructed in accordance with my invention.
Figure 2:
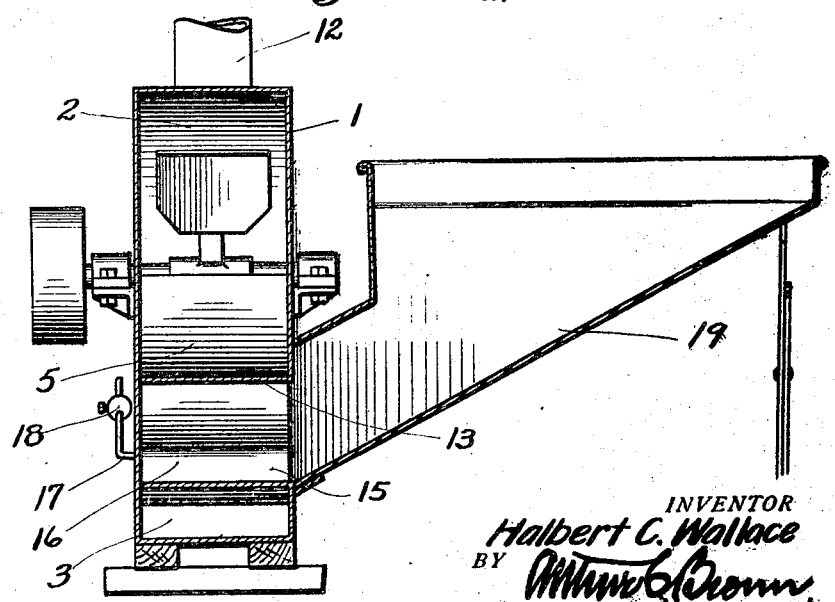
Fig. 2 is a cross sectional view on the line 2—2 of Fig. 1.

The blower casing 1 is divided into a whorl or fan chamber 2, a grain impelling chamber 3 of progressively decreasing cross sectional area from the impeller casing to a point where the grain is discharged into it, as at 4, and a pressure balancing chamber 5, communicating with the whorl chamber and with the grain propelling conduit, there being a hinged valve or wind board 6 within the casing 1 which is adapted to be swung on its hinge 7 by a rod 8, passing through the casing 1 so that the inlet port area of the air balancing chamber 5 can be varied. Since the wind board may be moved in one direction to reduce the effective inlet port area of the chamber 5 and at the same time increase the effective inlet port area of chamber 3 and since the board can be moved in an opposite direction to increase the effective inlet port area of the chamber 5 and decrease the effective inlet port area of the chamber 3, it may be said that the valve can vary the effective inlet port areas of the two chambers or conduits 3 and 5, one in inverse ratio with respect to the other because one chamber always has its inlet port area decreased in direct ratio with the increase of the other.

Beneath the arcuate partition 9 constituting the bottom of the whorl chamber is a perforate wall or baffle 10, against which the air from the air balancing chamber 5 is directed so that it may co-mingle with the air passing through the delivery conduit 11 in the casing 1, which aligns with the conduit 3 so that liability of eddies or back pressures forming in the conduit 11 will be eliminated. The end of the conduit 11, as at 12, leads to a suitable source of delivery.

The wall 13 of the pressure chamber co-operates with the inner wall 14 of the grain impelling conduit 3, to form a grain-receiving chamber or hopper 15, which has at its lower end a counter-balanced damper or door 16, connected to a crank shaft 17 on which is an adjustable weight 18 so that the grain will feed from the hopper or chamber 15 into the grain impelling chamber 3 where it will be picked up and forced through the discharge tube 12.

The chamber 15 is open at its side and it communicates with a hopper 19, fastened to the side of the casing 1. Therefore, grain can be dumped into the hopper 19 where it will feed down its inclined bottom into the hopper or chamber 15 and from there it will feed into the grain delivery conduit or chamber 3 at a speed determined by the position of the adjustable weight 18 on the crank 17. Therefore, the rate of flow of the grain into the bottom of the casing 1 where it will be impelled by the air can be controlled.

It will be apparent that when the fan is operating and the grain is delivered to hopper 19, the air will be divided by the wind board or damper 6 so that the major portion may pass through the conduit 3 and since the conduit 3 is of progressively decreasing cross sectional area, a Venturi tube effect will be produced so that the air will be forced past the discharge orifice 16' of the grain chamber, normally closed by the flat valve or damper 16, at a considerable velocity so that the grain can be picked up and forced through 11 into 12 and out to the point of destination.

Since the air will move past 16' at a considerable velocity, it is apparent that there will be some eddies or back pressures at the outlet end of the chamber 15 were it not for the fact that air is delivered into the conduit 5, which is a pressure equalizing chamber feeding enough air through the passage 20 to compensate for the back pressure, thereby maintaining the pressure at the discharge end of the hopper or chamber 15 uniformly constant.

It will also be apparent from the foregoing that the grain will be picked up by the rapidly moving air without subjecting it to impact against the metallic sides of the fan blower. Therefore, the grain will be delivered to the point of destination unimpaired, and it will not have its kernels cracked as frequently happens with the ordinary fan blower which is used in connection with pneumatic conveyors.

What I claim and desire to secure by Letters-Patent is:

1. A grain blower comprising a casing, a whorl chamber in the casing, an impeller in the whorl chamber, a chamber in the casing eccentric to the whorl chamber communicating with the whorl chamber, and an inclosed transverse grain receiving hopper in the casing having an inlet through the wall of the casing and a discharge opening to permit grain to discharge into the eccentric chamber outside the whorl chamber, the eccentric chamber having an end discharging into the casing above the stream lines of air passing through the casing.

2. A fan blower comprising a casing, a whorl chamber in the casing, an air impeller in the whorl chamber, a conduit communicating with the whorl chamber and eccentric to the whorl chamber, means for varying the effective port area of the conduit with respect to the air chamber, a grain chamber in the casing having a discharge end communicating with the conduit so as to discharge the grain in the path of air stream lines passing through the conduit, a counterbalanced valve at the discharge end of the grain chamber movable in response to the weight of grain within the chamber to vary the effective port opening which it valves in response to the weight of grain in the grain chamber.

3. A grain blower comprising a casing having an inlet and a discharge conduit, the discharge conduit being at the end of the casing, a fan chamber in the casing which communicates with atmosphere through the inlet, a fan rotatable within the chamber to impel air therefrom, an air passageway between the discharge end of the fan chamber and the discharge conduit, a grain inlet chamber in the passageway spaced from the sides of the passageway so that air from the fan casing will pass on both sides of the grain chamber, the grain chamber having a discharge opening for discharging grain into the passageway and a valve at the discharge end of the grain chamber movable in response to the weight of the grain in the grain chamber.

4. A grain blower comprising a casing, a fan chamber in the casing, a fan rotatable within the chamber to impel air therefrom, a main eccentric air passageway within the casing, communicating with said chamber, an auxiliary air passageway within the casing communicating with the chamber and discharging into the main passageway between the inlet and the outlet of the main passageway, means for directing grain into the main passageway at the point where the main passageway merges with the auxiliary air passageway and a perforate plate in the main passageway and in spaced relation with the fan chamber.

5. A grain blower comprising a casing, a fan chamber in the casing, a fan rotatable within the chamber to impel air therefrom, a main eccentric conduit communicating with said chamber and an auxiliary conduit communicating with said chamber and discharging into the main conduit at a point between the inlet and outlet of the main conduit, a grain chamber between the inlet of the main conduit and the discharge end of the auxiliary conduit and means for varying the effective port area of the auxiliary conduit.

6. A grain blower comprising a casing, a fan chamber in the casing, a fan rotatable within the chamber to impel air therefrom, a main conduit communicating with the fan chamber, an auxiliary conduit communicating with the fan chamber and discharging into the main conduit at a point distant from the inlet to the main conduit, a grain chamber between the main conduit and the auxiliary conduit and means for simultaneously varying the effective port areas of the main conduit and the auxiliary conduit, the effective port areas of the two conduits varying in inverse ratio one with respect to the other.

7. A fan blower comprising a casing, a fan chamber within the casing, a fan therein, an air passageway in the casing communicating with the fan chamber and curved for a part of its length about the fan chamber, a transverse chamber in the casing dividing the air passageway into a main conduit and an auxiliary conduit, both communicating with the fan casing, the grain chamber having a valve discharge port above the bottom of the passageway, and a manually operated valve having swinging movement in the casing in one direction to constrict the effective port area of the auxiliary conduit with respect to the fan casing and increase the effective port area of the main conduit with respect to the fan casing and vice versa.

8. A fan blower comprising a casing, a fan chamber within the casing, a fan therein, a conduit having its inlet communicating with the fan chamber and its outlet communicating with the conduit through which the grain is to be distributed, a hopper carried by the casing having its discharge end communicating with the conduit outside the fan casing, the hopper having spaces around opposite side walls through which air may pass from the fan chamber to a point beyond the discharge opening of the hopper, and means for automatically valving the discharge end of the hopper in proportion to the weight of the grain in the hopper.

9. A fan blower comprising a casing, a fan chamber in the casing, a fan in the chamber, a conduit in the casing having its inlet communicating with the fan chamber and its outlet communicating with a conduit through which the grain is to be discharged, means for delivering grain into the conduit outside the fan chamber, and an auxiliary conduit having its inlet communicating with the fan chamber and its outlet communicating with the first named conduit adjacent to the point at which the grain is admitted into the main conduit.

10. A fan blower comprising a casing, a fan chamber in the casing, a fan in the chamber, a conduit in the casing having its inlet communicating with the fan chamber and its outlet communicating with a conduit through which the grain is to be discharged, means for delivering grain into the conduit outside the fan chamber, an auxiliary conduit having its inlet communicating with the fan chamber and its outlet communicating with the first named conduit adjacent to the point at which the grain is admitted into the main conduit, and a perforate baffle in the first named conduit and in rear of the point at which the grain is discharged.

In testimony whereof I affix my signature.

HALBERT C. WALLACE.